May 25, 1965  L. R. FLINK  3,184,846
DIRECTION AND POSITION INDICATING APPARATUS
FOR VEHICLES SUCH AS AIRCRAFT
Filed Jan. 12, 1961
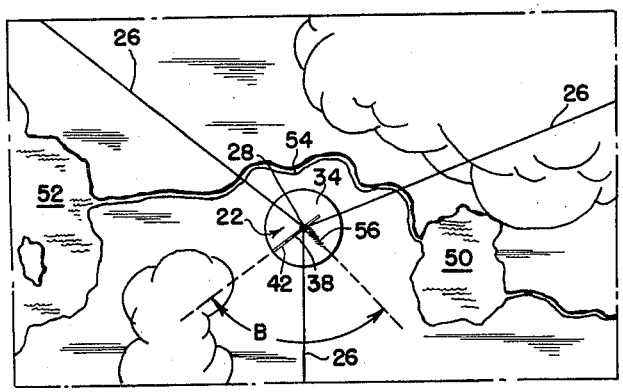
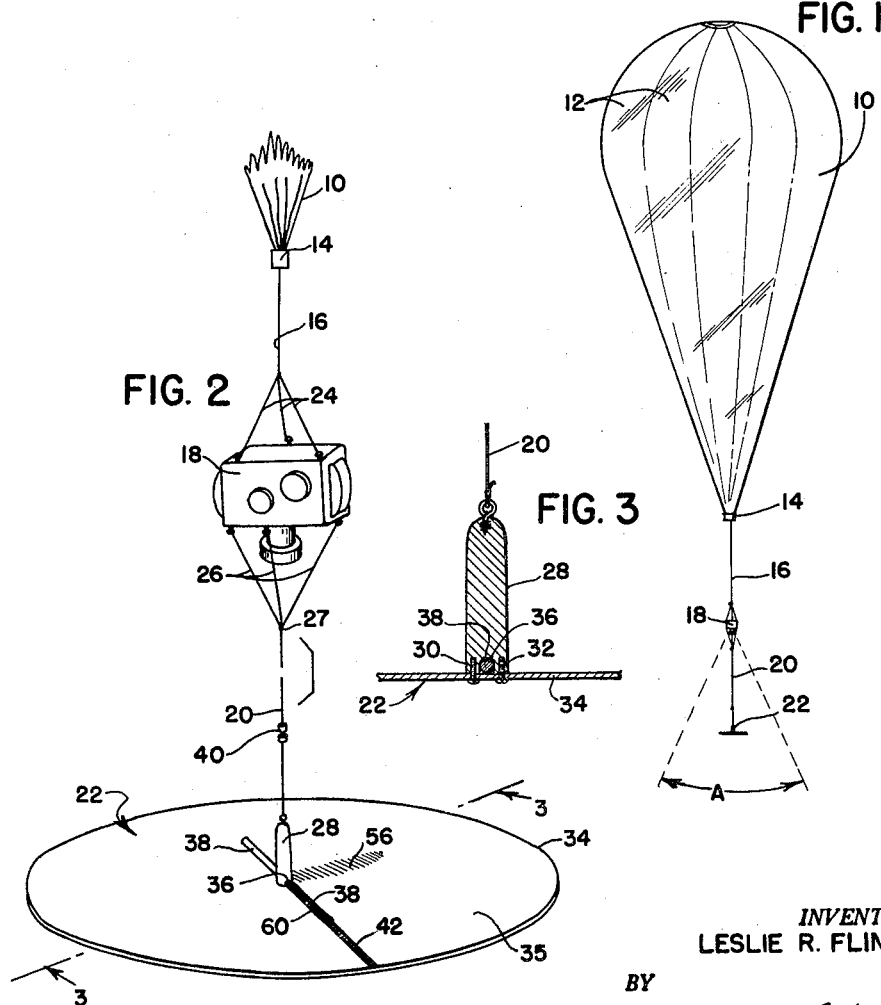
INVENTOR.
LESLIE R. FLINK
BY
William C. Babcock
ATTORNEY

United States Patent Office 3,184,846
Patented May 25, 1965

3,184,846
DIRECTION AND POSITION INDICATING APPARATUS FOR VEHICLES SUCH AS AIRCRAFT
Leslie R. Flink, St. Paul, Minn., assignor, by mesne assignments, to Litton Systems, Inc., Beverly Hills, Calif., a corporation of Maryland
Filed Jan. 12, 1961, Ser. No. 82,271
3 Claims. (Cl. 33—1)

This invention relates to direction and position indicating apparatus and more particularly to apparatus adapted to indicate the positioning and orientation of photographs taken from aircraft in conducting aerial surveys.

There has been considerable activity in recent years in the field of high altitude and meteorological research. Several techniques have been proposed for determining the position and orientation of an aircraft at the time data is recorded. In some cases this information has been recorded photographically. The present invention provides a much simpler, less expensive and lighter weight apparatus for determining direction and position than has been available heretofore. It is thus particularly suitable for use on balloon flights where the weight of equipment must be kept to an absolute minimum and moreover it may be considered expendable. In carrying out meteorological and other types of aerial surveys the apparatus of this invention, because of its light weight, can be sent aloft with a relatively small weather balloon.

According to the present invention, photographs taken from a balloon or other aircraft provide information concerning the geographical position of the balloon with respect to the land areas photographed, the direction of magnetic north, the altitude angle of the sun and the azimuth of the sun. With these items of information, and if the time the picture was taken and the magnetic declination are known, it is possible to mathematically or graphically calculate the geographical position of the balloon at the time the picture was taken, even though the ground below the balloon was obscured by clouds. Thus, while the position and direction indicating assembly is useful in itself it is particularly well adapted for use in connection with a camera to provide information as a part of a photograph taken from such camera.

It is one object of the present invention to provide an improved direction and position indicating apparatus for vehicles such as aircraft.

It is another object of the present invention to provide an improved aerial survey apparatus which is very light in weight and may be considered expendable so that it is well adapted for use with weather and aerial survey balloons.

It is a more specific object of the present invention to provide an expendable light weight apparatus to provide information including in a photograph from which the geographical position of the camera at the time the photograph was made can be easily calculated.

The invention will be better understood with reference to the following description illustrating one example of the invention taken in conjunction with the accompanying drawings wherein;

FIGURE 1 is a side elevation of one embodiment of the present invention attached to a weather balloon for use in weather or aerial surveys;

FIG. 2 is a perspective view of the apparatus as shown in FIGURE 1;

FIG. 3 is a vertical sectional view taken along line 3—3 of FIG. 2 and

FIG. 4 illustrates the type of photographs taken from the apparatus of FIGURES 1–3.

Referring now to the figures there is shown in FIGURES 1 and 2 an aircraft such as balloon 10 formed from a number of tapered gores 12 of a light weight gas impervious sheet material such as polyethylene sealed together along their edges. The balloon 10 contains a suitable lifting gas such as helium which is pumped into the balloon 10 through an inflation opening 14 in the bottom thereof.

Attached to the bottom of the balloon by suitable connecting means such as cable 16 is an aerial camera 18. Suspended within the field of view of aerial camera 18 by a suitable means such as connecting cable 20 is a preferred position and direction indicating apparatus 22 described hereinbelow. To stabilize the camera 18 it is preferably attached to connecting cable 16 by means of a plurality of relatively short lengths of harness cable 24 which are secured by any suitable means to the camera 18 at spaced apart positions on the upper surface thereof. Each of the harness cables 24 thus supports a part of the weight of the camera. It will be understood, however, that it may be desirable in some cases to attach the camera 18 directly to the bottom portion of the balloon. If this modification were made, cables 16 and 24 would be unnecessary.

Connecting cable 20 is suspended from camera 18 by means of a plurality of harness cables 26 attached to the bottom face of camera 18 at spaced apart positions. Cable 20 is secured to each of cables 26 at a point 27 located on the optical axis of camera 18. The lengths of cables 24 and 26 are adjusted to assure that the optical axis of camera 18 is coextensive with that of cable 20. The axis of cable 20 is maintained in a vertical position by gravitational attraction on the apparatus attached to the lower end of cable 20.

As seen in FIGURE 1 the field of view designated A of the camera extends beyond the side edges of the position and direction indicating apparatus 22 so that a picture of the latter is included within the area of each photograph taken from the camera as shown in FIGURE 4. The information afforded by the position and direction determining apparatus, as explained more fully hereinbelow, thus appears in each of the photographs taken by the camera 18.

The position and direction indicating device (best seen in FIGURES 2 and 3) comprises a shadow casting means such as vertical post 28 associated with an indicating member such as a relatively flat circular plate 34 having an indicating surface 35. Post 28 is associated with plate 34 by securing one end of post 28 by any suitable fastening means such as screws 30 and 32 to the center and normal to the surface 35. The post 28 is provided with a shape and height adapted to cast a sun azimuth indicating reference shadow 56 across the surface 35. The post 28 may be formed from any suitable material but should be made of a material heavy enough to prevent the plate 34 from being deflected by occasional gusts of wind. Plastic or light weight metal are both satisfactory materials.

A magnetic indicating member such as rod 38 is associated with surface 35 to provide a compass indicating reference line across the surface 35. Preferably the rod 38 is associated with the surface 35 and post 28 so that the axes of the post and of rod 38 intersect at the center of surface 35 to provide on the indicating surface a visible angular relationship between the azimuth reference shadow and the compass reference line within the camera field. To accomplish this end, a lateral groove 36 is provided in the bottom end of post 28 to serve as a means for securing the member 38 to the post 28. The rod 38 is preferably formed from elongate metal rod of permanently magnetic material. The rod 38 is magnetized so that there exists at one end a north pole and at the other end a south pole.

The post 28, plate 34 and rod 38 are made freely rotatable about a vertical axis by the provision of a suitable low friction pivot or swivel 40 in connecting cable 20. The post, plate and magnetic rod are thus adapted to pivot about the axis of the connecting line 20 and the optical axis of the camera 18 so that the magnetic rod 38 serves as a magnetic compass. It will be understood, however, that it is not necessary that the post 28 and plate 34 be rotatable as long as the rod 38 is mounted for free swinging movement in a horizontal plane.

To assure that the camera will record the position of the rod 38, it is preferred that the plate 34 be rigidly secured to rod 38 and provided with distinguishing indicia such as a heavy black mark 42 coextensive with the axis of rod 38. If desired, the portion of rod 38 designated 60 may be marked in a similar manner. The upper surface of the plate 34 should be a contrasting color to that of portion 60 and mark 42.

The operation of the device will now be described with particular reference to FIGURES 2 and 4. As indicated above, an image of the position and direction indicating device 22 is to be included in the photographs similar to that illustrated in FIGURE 4 taken from the camera 18. Since the approximate center of the plate 34 is suspended from a point on the optical axis of the camera 18, the indicating device 22 will be positioned in the center of the photograph taken from the camera. When land marks such as lakes 50 and 52, river 54 and the like are shown in a photograph, the exact position of the balloon at the time the photograph was taken can be easily determined by comparison of the photograph with the maps of the general area. The position and direction determining device can swing freely on cable 20 and therefore gravitational attraction will cause it to be positioned on a line extending vertically downward from the camera 18 so that the position of plate 34 in the photograph with reference to the landmarks shown in the photograph corresponds to the exact geographical location of the camera at the time the picture was taken. Gravitational attraction also provides a means for maintaining post 28 in a vertical position and plate 34 in a horizontal plane regardless of changes in the orientation of balloon 10 with respect to the earth.

It will be readily apparent, however, that under some conditions, usually because of cloud coverage, no landmarks will appear in the photograph. Under these conditions, the device 22 will provide information from which the geographical position can be determined.

The present invention is also useful in survey work for the purpose of obtaining information from which maps can be made, each photograph provides surface detail as well as information from which the location of each photograph can be readily calculated.

The direction of magnetic north will be indicated by orientation of the magnetic rod 38 and plate 34 since they are attached rigidly together and both freely rotatable about the axis of cable 20 through the action of pivot 40. As explained hereinbefore, a portion 60 of the magnetic rod 38 and the part of plate 34 co-extensive with the axis of the rod 38 and adjacent portion 60 is colored to contrast markedly with the remainder of the upper surface of plate 34 so that the orientation of rod 38 about a vertical axis 28 will be clearly visible. It will be apparent that when a marking such as mark 42 is used, magnetic rod 38 may be placed either above or below the plate 34 as long as the plate and rod are fastened rigidly together.

The post 28 may be made of any suitable materials such as plastic or metal but must be of sufficient weight to assure the horizontal orientation of plate 34 and the vertical orientation of post 28. Post 28 is made of a different diameter than the diameter of rod 38 so that the shadow 56 of post 28 cast by the sun onto plate 34 will be of a different width and as a result clearly distinguishable from the magnetic rod 38 and mark 42.

The length of the shadow 56 will vary as the altitude angle of the sun while the angular orientation (designated B in FIGURE 4) of shadow 56 about the axis of post 28 with respect to mark 42 will indicate the azimuth of the sun. This information will be clearly visible in photographs taken from camera 18 as can be seen by inspection of FIGURE 4.

An important feature of the present invention is the accuracy with which the azimuth angle B of the sun can be measured on the photograph. Since the direction of magnetic north and the shadow of post 38, both appear in the photograph, it is possible to determine the angle B with a single measurement thereby holding cumulative errors to a minimum.

Once the azimuth and altitude of the sun are known, as well as the time that the picture was taken and the magnetic declination, it is possible to graphically or mathematically determine the geographical position of the camera at the time the picture was taken. The camera 18 is preferably a time lapse camera adjusted for taking pictures at predetermined intervals of time. By this means it is possible to know the time that any specific photograph was taken. Alternatively, the face of a clock (not shown) may be included in the photograph to provide the same information.

The invention thus provides an efficient, lost cost method for making aerial surveys such as weather and cloud observations as well as for obtaining aerial photographs of surface terrain from which maps can be made. The apparatus is easily constructed, low in cost, and can be considered expendable. When the ground beneath the aircraft is not obscured by the clouds, the present invention makes it possible to determine the exact geographical position of the balloon with respect to landmarks on the ground. If the ground beneath the aircraft is overcast with clouds as often occurs during meteorological studies, it is possible to determine the geographical position of the aircraft by photographs taken from such aircraft, the photographs including both the phenomena being observed such as cloud formations as well as the position and direction indicating assembly suspended below the camera.

In view of the principles set forth herein, there are shown some of the ways of carrying out the present invention and some of the equivalents which are suggested from these disclosures.

What is claimed:

1. An aerial survey device comprising an aircraft, a position and direction indicating apparatus including, a flat plate, a post connected to said plate normal to the surface thereof, an elongate magnet connected to said plate, said magnet being magnetized so that there exists a north pole at one end and a south pole at the other end, indicia means projecting radially from the post coextensive with the axis of said elongate magnet to distinguish said magnet from the surface of said plate, means for suspending said apparatus below said aircraft, pivot means connected between said apparatus and said aircraft for allowing said apparatus to rotate with respect to said aircraft about the axis of said post, the weight of said plate and said post being adapted to maintain said plate in a horizontal plane and the axis of said post in a vertical position regardless of changes and orientation of said aircraft with respect to the earth.

2. A position and direction indicating apparatus adapted for use with aircraft comprising in combination a flat plate, a post connected to said plate normal to the surface thereof, an elongate magnet connected to said apparatus, said magnet being magnetized such that there exists a north pole at one end and a south pole at the other end, pivot means operatively associated with said magnet to allow said magnet to rotate freely about an axis perpendicular to the axis of said magnet, said plate being adapted to provide a surface for the projection of the shadow of said post produced by the sun, at least one cable for connection between said aircraft and one end of said post, said post and plate being suspended from said aricraft solely by such cables the weight of said post and said plate being adapted to maintain said post in a vertical position and said plate in a horizontal position independent of changes in the orientation of said aircraft with respect to the earth.

3. A position and direction indicating apparatus adapted for use in conjunction with aircraft comprising in combination a flat plate, a post connected to said plate substantially in the center thereof, said post being positioned normal to said plate, an elongate permanent magnet connected to the said post, pivot means operatively associated with said apparatus to allow said magnet to rotate freely about an axis perpendicular to its own axis, a camera connected with respect to said post and to position said camera with respect to said post and plate whereby said post and plate are included in photographs taken by said camera, the optical axis of said camera being substantially co-extensive with the axis of said post, connecting means attached between said camera and said post and means for maintaining the optical axis of said camera and the axis of said post in a vertical position independent of changes in the orientation of said aircraft with respect to the earth.

References Cited by the Examiner

UNITED STATES PATENTS

| | | | |
|---|---|---|---|
| 106,735 | 8/70 | Smith | 33—62 |
| 1,300,716 | 4/19 | Frolek | 95—12.5 |
| 1,490,487 | 4/24 | Schmidt | 33—1 |
| 2,167,072 | 7/39 | Hendrickson | 33—205.5 |
| 2,612,693 | 10/52 | Schonstedt | 33—61 |

FOREIGN PATENTS

| | | |
|---|---|---|
| 442,088 | 8/12 | France. |
| 54,333 | 11/90 | Germany. |

ISAAC LISANN, *Primary Examiner*.

UNITED STATES PATENT OFFICE
CERTIFICATE OF CORRECTION

Patent No. 3,184,846                                         May 25, 1965

Leslie R. Flink

It is hereby certified that error appears in the above numbered patent requiring correction and that the said Letters Patent should read as corrected below.

Column 5, lines 18 and 19, for "with respect to said post and" read -- to said post and plate, means --.

Signed and sealed this 22nd day of February 1966.

(SEAL)
Attest:

ERNEST W. SWIDER                                         EDWARD J. BRENNER
Attesting Officer                                                Commissioner of Patents